(12) United States Patent
Mueller, III et al.

(10) Patent No.: US 12,280,354 B2
(45) Date of Patent: Apr. 22, 2025

(54) DEVICE AND METHOD FOR INVESTIGATING CHEMICAL PROCESSES

(71) Applicant: HTE GMBH THE HIGH THROUGHPUT EXPERIMENTATION COMPANY, Heidelberg (DE)

(72) Inventors: Andreas Mueller, III, Heidelberg (DE); Michael Dejmek, Heidelberg (DE); Oliver Puettmann, Heidelberg (DE); Alexander Higelin, Heidelberg (DE); Fabian Schneider, Heidelberg (DE); Guido Wasserschaff, Heidelberg (DE)

(73) Assignee: HTE GMBH THE HIGH THROUGHPUT EXPERIMENTATION COMPANY, Heidelberg (DE)

( * ) Notice: Subject to any disclaimer, the term of this patent is extended or adjusted under 35 U.S.C. 154(b) by 0 days.

(21) Appl. No.: 17/642,414

(22) PCT Filed: Sep. 11, 2020

(86) PCT No.: PCT/EP2020/075499
§ 371 (c)(1),
(2) Date: Mar. 11, 2022

(87) PCT Pub. No.: WO2021/048375
PCT Pub. Date: Mar. 18, 2021

(65) Prior Publication Data
US 2022/0339598 A1    Oct. 27, 2022

(30) Foreign Application Priority Data
Sep. 13, 2019 (DE) .................. 10 2019 214 018.1

(51) Int. Cl.
*B01J 19/24*        (2006.01)
(52) U.S. Cl.
CPC ...... *B01J 19/249* (2013.01); *B01J 2219/2453* (2013.01); *B01J 2219/2458* (2013.01);
(Continued)
(58) Field of Classification Search
CPC .............. B01J 19/249; B01J 2219/2453; B01J 2219/2458; B01J 2219/2467;
(Continued)

(56) References Cited

U.S. PATENT DOCUMENTS

| | | |
|---|---|---|
| 2003/0031914 A1 | 2/2003 | Frank et al. |
| 2014/0323694 A1 | 10/2014 | Von Keitz et al. |
| 2017/0219148 A1 | 8/2017 | Ozono et al. |

FOREIGN PATENT DOCUMENTS

| | | |
|---|---|---|
| EP | 0529329 A2 | 3/1993 |
| EP | 0861802 A2 | 9/1998 |
| EP | 3124909 A1 | 2/2017 |

OTHER PUBLICATIONS

"Miniaturized Reactors in Combinatorial Catalysis and High-Throughput Experimentation" Zech, T. et al., Microstructured Reactor Systems, Chimia 56 (2002), pp. 611-620.
(Continued)

*Primary Examiner* — Huy Tram Nguyen
(74) *Attorney, Agent, or Firm* — Element IP, PLC

(57) ABSTRACT

The invention relates to a device, stacked plate reactor and to a method for investigating chemical processes to be carried out simultaneously or almost at the same time on a large number of functional element variations of the process parameters.

20 Claims, 8 Drawing Sheets

(52) U.S. Cl.
CPC ............. *B01J 2219/2467* (2013.01); *B01J 2219/2469* (2013.01); *B01J 2219/2493* (2013.01); *B01J 2219/2496* (2013.01)

(58) Field of Classification Search
CPC ........ B01J 2219/2469; B01J 2219/2493; B01J 2219/2496; B01J 2219/00308; B01J 2219/00495; B01J 2219/00698; B01J 2219/00702; B01J 2219/00747; B01J 2219/2461; Y02E 60/36
USPC ........................................................ 422/199
See application file for complete search history.

(56) References Cited

OTHER PUBLICATIONS

International Search Report on International Application No. PCT/EP2020/075499 dated Nov. 19, 2020, 3 pages.

DEVICE AND METHOD FOR INVESTIGATING CHEMICAL PROCESSES

FIELD OF THE INVENTION

The present invention relates to an apparatus for studying chemical processes, to a stacked reactor for studying chemical processes, and to a method of studying chemical processes, with the aid of which it is possible to undertake process-related or material-specific optimizations simultaneously or in a close correlation in time on a large number of functional elements with variation of the process parameters.

BACKGROUND OF THE INVENTION

In the field of high-throughput research, there is a constant need to be able to conduct the tests and examinations to be conducted more quickly and efficiently. Particularly in the field of development of catalysts and the optimization of processes, it is a very complex matter to bring the components to be tested into the corresponding apparatuses in order then to subject them to corresponding tests. For the study of catalysts, apparatuses and processes, including the software programs required, are provided in order to improve and to accelerate research work. As a result, it is possible to rework industrial processes with high accuracy in the laboratory. The large amount of data and high accuracy help in reducing the number of studies that have to be conducted on the pilot plant scale. As a result, it is possible to save time and energy in the development of products.

Even going back several decades, the prior art discloses apparatuses and processes for studying chemical processes in the field of high-throughput research. It is also known that it is possible to use reactor systems having different structural designs for the performance of the tests. For example, DE 100 36 633 A1 describes an arrangement for testing of catalysts having modules in block form, in which a reactor module is disposed between temperature control modules. For the studies, the reaction channels are equipped with catalysts. In the field of microreactor technology, reactors constructed in plate form are often used. Reactors in plate form in the field of microreactor technology are described in WO 00/51720. The reactors are composed of plates arranged in a stack, with the individual plates having different technical functions. Examples of these functions include plates containing channels in the form of holes that accommodate catalysts. As an alternative, there are plates having microstructures as distribution channels that guide the fluid to or away from the reaction channel. A reactor constructed in plate form is described in EP 1 329 258 A2. WO 2019/122101 A1 describes a reactor system for flow reactions, constructed from two blocks, interlayers and a contact pressure device. One of the interlayers comprises a channel structure element that contains the reaction channel and has a sealing connection with respect to the adjacent layers. T. Zech, P. Claus, D. Honicke: "Miniaturized reactors in combinatorial catalysis and high-throughput experimentation"; CHIMIA International Journal for Chemistry, 2002, vol. 56, no. 11, p. 611-620, discloses a microchannel stacked reactor in which a stack of metal frames is provided, with a laterally inserted catalyst plate. DE 101 59 189 A1 discloses a method of testing constituents of a substance library in which testing of a library constituent for a performance property and detection of a measurement parameter by a sensor are conducted continuously. DE 602 15 198 T2 discloses a method of producing seals between various elements of a conventional fuel cell or fuel cell arrangement in order to prevent loss of gases and liquids that are required for operation of individual fuel cells. DE 196 32 779 A1 discloses a process and an apparatus for studying chemical reactions in miniaturized reactors connected in parallel. U.S. Pat. No. 5,595,712 A discloses an apparatus for chemical mixing and reacting.

SUMMARY OF THE INVENTION

The present invention provides an apparatus for studying chemical processes according to the independent claims, with further embodiments of the invention embodied in the dependent claims.

In one embodiment of the invention, an apparatus for studying chemical processes is provided, having: an oven having at least one oven chamber; a stacked plate reactor having a multitude of mutually adjacent plate-shaped building blocks and at least one feed for a reactant and at least one drain for a product; and a connection device for connection of the stacked plate reactor to at least one oven-side feed for a reactant and at least one oven-side drain for a product; wherein the oven chamber has a receiving device configured such that it can accommodate the multitude of mutually adjacent shaped building blocks of the stacked plate reactor; wherein the multitude of shaped building blocks of the stacked plate reactor in the receiving device are stacked one on top of another in such a way that they have a multitude of cavities each with a feed for a reactant and at least one drain for a product, and one of a reactive device and a nonreactive device that each form an individual reactor; wherein the receiving device has a press device configured such that it can compress the multitude of stacked mutually adjacent shaped building blocks of the stacked plate reactor in stacking direction; wherein the multitude of reactor chambers may electively be connected in parallel and/or in series.

The reactor may have a quick-change clamping device (QCCD) having standardized insertion cassettes. The QCCD may have an expansion compensation function for maintaining leak-tightness in the case of high-temperature reactions. The QCCD may permit the changing of individual cassettes in the ambient pressure state. Each cassette may be electrically separated from all adjacent cassettes. Each cassette may be thermally separated from all adjacent cassettes. The QCCD may have a mechanical connection that does not run over multiple cassettes and hence prevent the occurrence of leaks, long-range thermal interactions or even short circuits. The cassettes may be provided with different inserts for the tasks of guiding the flow and accommodating material, and the level of parallelization. It is possible for either one plate electrode or multiple plate electrodes to be connected to one another via appropriate flow guides within an insert cassette. The flow guides may be distinct from the material supports. The flow guides may be characterized by complex structures for distribution of fluids and electrical currents. The material supports may be constructed such that they are inexpensive to produce and only of low complexity. In the simplest case, they may be rectangular plates with coating on one side. The material supports may have simple formats along the complex workflow (synthesis, reaction, analysis). The flow guides may have simple formats within the clamping device. The flow guide formats may also differ within the QCCD when the influence of different flow guides or else diffusion layers or else electrical contacting variants on a material support which is always the same is to be examined.

In addition, the insert cassettes may be covered with visually transparent sheets, such that it is possible for a plate-like light source that has likewise been introduced into the stack to shine through them, in order thus to enable electro-photo-catalytic processes.

Material supports and flow guides may be combined to give process-specific cells. Examples are cells for water electrolysis, cells for CO2 co-electrolysis with water, cells for membrane separation processes.

Cells may be preassembled outside the plant in order to enable dust-free assembly of the cell constituents, which is only sealed after installation into the reactor by the clamping device. This means that the cell seals already installed in the preassembly cannot be put under compressive stress until this time. All fluidic connections to the cells may be provided with quick couplings in order to enable installation and deinstallation. All electrical connection wires may also be designed so as to be connectable by plug connection. All fluidic connections to the cells may be designed as electrically nonconductive plastic conduits. For reduction of electrical or ionic conductivity along the connecting conduits, these may additionally be laid in loops. This is associated with an increase in the resistance between reactor and environment. In addition, the insert cassettes may be covered with visually transparent sheets, such that it is possible for a plate-like light source that has likewise been introduced into the stack to shine through them, in order thus to enable electro-photo-catalytic processes.

In addition, the electrode surfaces of the cells may be separated into electrically insulated subunits and connected electrically. In this way, it is possible to flexibly achieve different electrode areas for the same construction size of the cell.

The electrical connections that can be connected by plug connection may be designed such that plug contacts are mounted at different heights, for example, which means that electrode areas of different size can be conductively connected to the power source within a cell.

A reactive device may be understood to mean a device that serves to perform conversion of matter or to perform chemical processes. A nonreactive device may be understood to mean a device that serves to perform physical processes, for example an adsorption, a separation, a purification and/or a depletion or enrichment of substances.

In this way, it is possible to undertake chemical studies simultaneously or in a close correlation in time on a large number of functional elements with variation of the process parameters. By means of screening technology, it is made possible for the user to characterize multiparameter spaces with high accuracy and precision within short periods of time, and to use the characterization data achieved here to draw conclusions as to how functional elements or chemical processes can be improved. The improvement and optimization of industrial processes is highly important since it is urgently necessary to increase the resource efficiency of the chemical processes and optimize it if possible.

A reactor or individual reactor in the context of the invention is understood to mean an apparatus with which a reactant can be subjected to a treatment in order to obtain a product therefrom. The treatment may be chemical, in this case with a reactive element or a reactive device, for example a catalyst, or mechanical, in this case with a nonreactive element such as a filter. In addition, the treatment may be electrical, in which case the electrical treatment may be effected either by a reactive element, for example a galvanic element, or by a nonreactive element such as a capacitor which, for instance, subjects the reactant to an electrical field.

A main application may lie in the processing of gas/liquid systems. The liquid phase here may assume the function of ion conductivity and provide the reaction space in which dissolved or undissolved gases react with liquids or with one another or with other gases and liquids. Since the reaction must take place below the boiling temperature of the liquid components in question, the reactions involved here are low-temperature reactions. A further application may be processes in which all reactions take place in the gas phase. In this case, a porous solid-state electrolyte may assume the function of ion conductivity between the electrodes and also serve as reaction space. Since the reaction takes place at temperatures above the boiling temperature of the substances in question, the reactions involved here are high-temperature reactions. Heterogeneous immiscible liquid/liquid systems may be processed analogously to gas/liquid systems. This also relates to the separation after the reaction. A triphasic mixture (liquid/liquid/gas) may then be formed here. Homogeneous miscible liquid/liquid systems may be processed analogously to pure gas phase systems at correspondingly low temperatures.

In one embodiment of the invention, the reactive device is selected from a group consisting of a membrane plate reactive element, an electrochemical plate reactive element, a fuel cell reactive element, an electrocatalyst, a photocatalytic plate reactive element, a photocatalytic plate element with integrated LED source, a catalytically active plate reactive element for heterogeneous catalysis. Different reactive devices in a stacked plate reactor may also be different types of reactive devices or elements.

In this way, it is possible to provide reactive devices. The respective reactive substance may especially be provided by coating of the plate surfaces, by impregnation of the porous plate surfaces and/or by introduction of solid particles into recesses in the plate surface.

In one embodiment of the invention, the reactive device may have elements for generation of electromagnetic waves.

In this way, it is possible to utilize the vibration energy of the electromagnetic waves for cleavage of chemical bonds in reaction mixtures.

In one embodiment of the invention, the reactive device is selected from a group of elements that implement or enable physical process steps that change the composition of matter, especially consisting of two-dimensional separators, such as membranes or absorbents or hollow fibre bundles that have membrane or absorbency properties, and solid particles having these properties.

In this way, it is also possible to provide alternative reactive devices.

In one embodiment of the invention, the nonreactive device is selected from the group of elements that enable or implement physical process steps that do not change the composition of matter, especially consisting of electrical heating or cooling elements for individually adjustable temperatures in the reactive devices, fluidic heating or cooling elements, heating elements based on a conversion of vibration energy of electromagnetic waves to the heating of reaction mixtures, and passive heating elements made of electrically conductive materials which come into contact with the reaction medium, or through which it flows, and are inductively heated, for example inductive heating by magnetic fields applied from the outside, platelike magnetic field coils for generation of such magnetic fields in the reaction medium, plate capacitors for imparting of static or dynamic electrical potentials to the reaction medium, plates for combination or distribution of flows, plates for thermal energy redistribution in order to simulate recycling processes within a process sequence, and static mixing elements for intermediate homogenization between successive process steps.

By contrast with the processes set out so far in which electrical energy is converted, it is possible for thermoelectric materials subjected to temperature differences to generate electrical energy. For this purpose, the cells may be equipped with plates of thermoelectric material together with plates that may be heated or cooled.

It is likewise possible to optimize the properties of thermal energy storage media. For this purpose, it is possible to use plates having defined mass and mass/area ratio, on which two-dimensional temperature sensors are mounted. For example, the temperature profile indicated by these, measured as a function of time, may be a measure of the storage capacity thereof if fluids are fed in at a defined mass flow rate. Furthermore, it is possible to measure thermal expansions of individual cells via expansion measurement strips or by laser optics, such that it is possible to characterize materials that expand under thermal or electrical load.

In addition, it is possible to make a distinction between primary and secondary reactor energy sources. Primary energy sources mean the main energy sources responsible for the conversion of the reactants, such as the potential applied for electrochemical processes. Secondary energy sources are, for example, reactor heating for fuel cells, for example, or reaction-inducing methods such as ultrasound or microwave excitation in conjunction with electrochemical processes.

In this way, it is possible to provide a multitude of nonreactive devices or elements.

In one embodiment of the invention, a nonreactive device is selected from a group of physical methods of measuring electrical parameters such as potential, voltage, resistance, through current, and more complex contact sensors on a chemical or physical basis and biological growth surfaces for bacteria, especially lab-on-a-chip or printed electronics devices produced by thin-film and microscale technology.

In this way, it is possible to provide nonreactive devices in order, for example, to obtain a constantly homogeneous conductivity within the active cathode coating, which is essential in the production of battery materials. Printed conductivity sensors that can be produced in a large number in an area permit the measurement of local conductivities on coated cathodes in the operating state or immediately thereafter. Surfaces structured by microscale technology may be utilized as growth surfaces for biofilms. These are utilizable in association with electrodes as electron sources for the electrically assisted conversion of carbon sources such as CO2 with the aid of bacteria that have become specialized for this conversion. These may be utilized, for example, for a screening task for the optimization of a genome of bacteria for an elevated conversion of CO2 to products of value.

A further application relates to the field of thermal energy storage means. For this purpose, it is possible to mount plates having defined mass and mass/area ratio and two-dimensional temperature sensors on one or both long sides of the storage plate. For example, the temperature profile thereof, measured as a function of time, may be a measure of its storage capacity if fluids are fed in at a defined mass flow rate. Thermal expansions of individual cells may be measured via expansion measurement strips or by laser optics, such that it is possible to characterize materials that expand under thermal or electrical load. By contrast with the processes set out so far in which electrical energy is converted, it is possible for thermoelectric materials subjected to temperature differences to generate electrical energy. For this purpose, the cells may be equipped with plates of thermoelectric material together with plates that may be heated or cooled.

In one embodiment of the invention, the apparatus comprises a supply module for providing resources for the adjustment of process parameters, an analysis module for analysis of at least one product, and a control device for control of the process parameters.

In this way, it is possible to provide a fully functioning device for studying chemical processes.

In one embodiment of the invention, the control device is configured such that it can separately control at least one of the process parameters for at least one of the individual reactors.

In this way, selective actuation of the individual reactors is possible, which enables optimization of the operation of the stacked plate reactor. The actuation can be effected here depending on measurement and analysis results from processes that proceed in different individual reactors, especially in individual reactors from which the products provide the reactants for the selectively actuated individual reactor.

In one embodiment of the invention, the receiving apparatus comprises a rail configured such that it can accommodate the shaped building blocks in a predetermined alignment and position.

In this way, a positioning aid is provided, which can ensure proper alignment of the shaped building blocks, and especially also positions the sealing thereof with respect to one another and any connections to one another.

In one embodiment of the invention, the rail of the receiving device constitutes a positioning aid of the press device.

In this way, not only is positioning of the shaped building blocks with respect to one another assured with regard to the alignment of the steering geometry and the connections, but compression of the shaped building blocks is also ensured.

In one embodiment of the invention, the receiving device is designed to compensate for thermal expansion of the stacked plate reactor, for example by application of the pressing force with auxiliary pneumatic or hydraulic energy. Such compression via a piston pressed on hydraulically which is fed from a pressure reservoir compensates for any thermal expansion; by virtue of the pressure controller readjusting the pressure, an additional expansion force should act on the piston and hence lead to an increase in pressure in the pressure reservoir.

In this way, it is possible to keep the forces between the shaped building blocks essentially constant. This may be of particular relevance for the sealing between the shaped building blocks. Compensation of thermal expansion may also be achieved by passive construction measures, for instance by spring elements or press or frame elements having a coefficient of thermal expansion, the geometry and coefficient of thermal expansion of which are such that it keeps the forces between the shaped building blocks essentially constant. The spring elements here may replace the above-described piston/reservoir mechanism.

In one embodiment of the invention, the stacked plate reactor has a heating device, wherein the heating device is designed such that it can heat the stacked plate reactor and hence causes thermal expansion of the stacked plate reactor that compresses the stacked plate reactor into the receiving device in such a way that a sealing geometry seals the respective shaped building blocks with respect to one another. The heating device may be a contact heater, for example in the form of plates or sleeves equipped with ducts and temperature control liquid. Alternatively or additionally, the heating apparatus may have electrothermal heating elements equipped, for example, with appropriate temperature sensors and closed-loop control elements in order to implement autonomous and automatic compensation for thermal expansion.

In this way, it is possible to control sealing via the heating. The heating may be provided in the individual shaped building blocks, for instance close to the sealing surfaces, or extend over the entire stacked plate reactor. The stacked plate reactor may be equipped with thermal sealing elements in combination with a corresponding heating device. The heating elements here may again replace the above-described piston/hydraulic mechanism. The receiving device may be configured such that the sealing is then effected only by expansion of the reactor against an immovable mechanical resistance.

In one embodiment of the invention, the apparatus has at least one separator functionally connected to at least one of the individual reactors and/or reactive elements of an individual reactor, wherein, in particular. the at least one separator is disposed in an oven chamber isolated from the oven chamber in which the stacked plate reactor is disposed.

In this way, the separators are able to accommodate volumes of condensate obtained during the reaction or a specially removed liquid phase from the stacked plate reactor. Furthermore, the separators may serve as a further separation stage after the first removal in the stacked plate reactor, in that, for example, a further separation from the gas phase is effected by appropriate cooling of the gas phase at the inner wall of the separator.

In one embodiment of the invention, the apparatus comprises a reader unit for reading identifiers provided on the shaped building blocks and a robot, wherein the reader unit is designed such that it can read identifiers provided on the shaped building blocks, wherein the robot is designed such that it assembles the shaped building blocks identified by the reader unit on the basis of a definable structural build plan or functional build plan for an intended functionality of the stacked plate reactor.

In this way, automated assembly of the stacked plate reactor is possible. The definable structural build plan can be created by the user according to the requirements on the stacked plate reactor. For this purpose, it is possible to use a display and visualisation device on which the user can visualize the composition of the stacked plate reactor in the creation of the build plan.

In one embodiment of the invention, the receiving device (40) is configured such that it can be opened and/or closed in an automated manner.

In this way, in a robot-assisted assembly, the receiving device is opened in an automated manner, the shaped building blocks are inserted automatically according to the build plan and the receiving device is closed in automated manner, and, for example, the contact pressure device is also actuated in an automated manner.

In this way, the automated adjustment of the sealing force enables faster installation and deinstallation and improved usability of the apparatus compared to manual operation. Defined adjustment of the sealing force also permits the use of pressure-sensitive media if bracketing in a force-bearing outer frame should not be possible.

In one embodiment of the invention, identification tags may be provided on at least some of the shaped building blocks, which identify the respective shaped building block and/or the functionalities or properties thereof.

In this way, it is possible to verify whether the correct shape building block is disposed at the intended place in the stacked reactor. In addition, robot-assisted assembly may be assisted if the identification tag is machine-readable. The identification tag may be a barcode, a QR code, another optical code or an RFID chip.

In one embodiment of the invention, a visualization device may be provided, which visualizes the conduit progressions of the feeds and drains into and out of the reactor chamber(s) on the basis of the shaped building blocks identified.

In this way, it is possible to effect a function check that visualizes to the user whether the stacked plate reactor, the interior of which the user is unable to see directly from the reactor, is assembled as intended and whether the conduits run as intended.

In one embodiment of the invention, the stacked plate reactor comprises a multitude of mutually adjacent plate-shaped building blocks; at least one feed for a reactant; at least one drain for a product; wherein the multitude of shaped building blocks of the stacked plate reactor are stacked one on top of another; wherein the multitude of shaped building blocks stacked one on top of another are compressible in stacking direction.

In this way, it is possible to provide a stacked plate reactor with a multitude of individual reactors that enables implementation of various variants of examination and testing operations under the same process conditions. Different individual reactors may be equipped, for instance, with different reactive or nonreactive devices or elements and be subjected to a trial or test run, for example at different pressures and temperatures.

In one embodiment of the invention, each of the shaped building blocks has a cavity on a plate surface of the shaped block with a circumferential sealing surface around the cavity and at least one of a feed for a reactant and a drain for a product that opens into a cavity in such a way that the cavities of two adjacent shaped blocks in the mutually facing and assembled state form a reactor chamber, wherein a reactive device is disposed between two adjacent shaped blocks.

In this way, it is possible to provide a highly modular stacked plate reactor, the shaped building blocks of which may be assembled in modular form, according to the requirement on the stacked plate reactor.

In one embodiment of the invention, the reactive device of at least one pair of shaped blocks is a catalyst and at least one of the two shaped blocks of the pair of shaped blocks has an electrical feed to the catalyst in order to individually or at the same time electrically actuate the catalyst.

In this way, it is possible to control not just the process parameters of the feed and drain and the chamber conditions but also to specifically control the catalyst. This especially enables quickly reacting actuation, especially when the catalyst is simultaneously also used as a sensor, and the sensor data thereof are employed as a basis for the actuation of the catalyst.

In one embodiment of the invention, each of the shaped building blocks has at least one conduit arrangement having at least one opening that opens on the plate surface with the cavity, such that conduit arrangements of two shaped blocks alongside one another on the cavity side are connected to one another via respective openings, and at least one of an opening that opens on the opposite plate surface from the plate surface with the cavity, and an opening that opens into the cavity.

In this way, it is possible to significantly simplify complicated coupling of the individual reactors and shaped building blocks. The conduits are then connected via the end faces of the shaped building blocks without first having to lead them to the outside. In this way, it is also possible to keep the temperatures more constant. In addition, in this way, automated assembly is significantly facilitated, especially since the connection of the conduits is already effected via the adjacent positioning and there is no need for any additional coupling.

In one embodiment of the invention, at least some of the shaped building blocks have an identifier, especially one which is machine-readable, that identifies the shaped building block with regard to a geometry of its conduit arrangement.

In this way, automated assembly can be effected, and this can be monitored, especially in the case of robot-assisted assembly.

In one embodiment of the invention, at least some of the shaped building blocks have a first conduit arrangement that serves for parallel connection of mutually adjacent reactor chambers, and a second conduit arrangement that serves for series connection of mutually adjacent reactor chambers, wherein the first and second conduit arrangements are arranged in the respective shaped building block in such a way that, in a first orientation of the shaped building block, the first conduit arrangement is connected to a corresponding conduit arrangement of an adjacent shaped building block and is active and, in a second orientation of the shaped building block, the second conduit arrangement is connected to a corresponding conduit arrangement of an adjacent shaped building block and is active.

In this way, it is possible to provide a multifunctional shaped building block that can implement different conduit flow regimes according to the orientation of its construction. As a result, it is possible to use one and the same shaped building block for different interconnection arrangements, parallel or in series, which in that case is used merely in a different orientation. The conduit connection can be varied by exchanging the sealing surfaces, or by rotation about the longitudinal axis of the stacked plate reactor while maintaining the direction of the sealing surface or else with an exchange of the sealing surface.

In one embodiment of the invention, a method of studying chemical processes using an above-described apparatus is provided, wherein the method comprises: choosing a mode of operation of the stacked plate reactor from parallel operation, series operation or mixed parallel and series operation of the individual reactors of the stacked plate reactor; configuring the stacked plate reactor by stacking the shaped building blocks according to the chosen mode of operation;

pressing the stacked adjacent shaped building blocks of the stacked plate reactor in stacking direction; introducing at least one reactant into the stacked plate reactor; controlling the process parameters of the individual reactors according to the chosen mode of operation; wherein the method conducted by the at least one individual reactor is selected from the group consisting of a gas separation method, an electrolytic cleavage, a hydrogenation of unsaturated compounds for example, a gas removal method, a conversion of electrical energy to chemical products of value, especially power-to-gas or power-to-liquid, a conversion of chemical binding energy to electrically usable energy, an assistance of catalytic processes by application of an electrical field for reduction of the activation energy in the case of chemical conversion of the particles or functionalized membranes in polyphasic mixtures.

In this way, it is possible to provide a method that permits chemical studies simultaneously or in a close correlation in time on a large number of functional elements with variation of the process parameters. It is made possible for the user to characterize multiparameter spaces with high accuracy and precision within short periods of time, and to use the characterization data achieved here to draw conclusions as to how functional elements or chemical processes can be improved.

In one embodiment of the invention, for the individual process stages, the process parameter of temperature is chosen within the range from 273.15 K to 1273.15 K, especially within the range from 298.15 to 1073.15 K, more especially at a temperature in the range of 373.15-873.15 K.

In one embodiment of the invention, for the individual process stages, the process parameter of pressure is chosen within the range from 0.05 to 500 bara, especially within the range from 0.1 to 300 bara, more especially in the range of 1 to 250 bara.

In one embodiment of the invention, the method can be conducted in different configurations, wherein the configurations are selected from the group consisting of screening configuration, integral process regime for implementation of subsequent processes, and configuration with upscaling of individual process steps or sequences of process steps.

In one embodiment of the invention, membranes are studied by selecting the reactive elements from the group consisting of multifunctional plates in the form of membranes that have catalytic activity, membranes having catalytically active components, and catalytically coated membranes, and also stacked membranes in which each membrane surface has a particular property.

In one embodiment of the invention, the formats of the material support is chosen such that they can be measured with measuring instruments on the surface thereof. These "offline measurements" can be effected before and after ("post-mortem") the use of the material supports in the EPR. With knowledge of the reaction conditions, it is then possible to obtain structure-activity relationships from the surface analysis. The properties of the materials affect the product quality, which can in turn be measured by online analysis (for example GC, MIR, current-potential curves) in the product stream. The appearance of the materials on the material supports can have a direct effect on the properties thereof (examples: coarse-grain or fine-grain microstructure, high porosity/low porosity, heterogeneous/homogeneous microstructure). To the correlations between online test operation and offline analysis, as described above, there are also correlations within offline analysis that gives further pointers (for example EDX and XRD measurement at the same point, measured on the material support). There is the option of providing systems in the field of computer vision that are capable of recognizing structures on surfaces and indicating the position thereof (for example by a two-dimensional coordinate system). With the aid of these coordinates, it is possible to instruct movable measurement devices to move specifically to these places. Computer vision systems are also capable of recognizing and classifying differences in structures on a surface.

By virtue of this formation of classes in conjunction with locally resolved measurements in different places on the material carrier, however, always within the same class, it is possible not just to correlate results from different test methods locally with one another but also within classes, and hence to ascertain class properties. With the aid of these class properties, particularly in heterogeneous materials, the synthesis of which is influenced in a very specific manner, since classes are frequently identical to different components or component mixtures. A simple example is the adjustment of the conductive fractions relative to the catalytically active fractions (but those that do not have good conductivity) in an electrocatalytically active material in order to obtained a high product yield, which in turn depends on the actually usable potential that arrives at the active material. It is obvious to expect that good electrical contacting of the active fractions will also lead to a high yield of desired product. On the other hand, the fraction of active material must not become too small either. By means of a computer vision system, it is possible to find the optimum of the two fractions by visually distinguishing the different fractions on account of the different morphology and comparing them to the product yield. The synthesis can then be correspondingly instructed to prepare new materials with this composition.

In addition, the insert cassettes may be covered with visually transparent plates, such that direct events can be observed at the surface with a platelike spectroscopic or optical sensor system likewise introduced into the stack.

The use of a KI is suggested. Electrocatalysis is a multiparameter field and is much more extensive than the parameter field in heterogeneous catalysis. For customary steady-state operation, the data rate is also affected here with increased demand by partly dynamic operation (cyclic voltammetry) or dynamic operation (impedance spectroscopy). Feedstocks (under the theme of "New raw material basis") are much more variable than our current crude oil basis. A basis for a software environment could be "Tensorflow", an open source program from Google.

Together with data for catalyst synthesis, using the co-recorded process data and the simultaneously measured online measurement data and the post-mortem measurement data, it is possible to suggest new instructions for meaningful parameter sets by means of the KI.

These and other features are elucidated by the description of figures that follows.

Further features and advantages of the methods of the invention and of the apparatus are apparent from the figures and from the accompanying description of figures. It will be apparent that the features which have been mentioned above and those which are still to be elucidated below can be used not only in the combination specified in each case but also in other combinations or on their own without leaving the scope of the invention. Working examples of the invention are shown in the figures and are described in detail hereinafter.

DETAILED DESCRIPTION OF WORKING EXAMPLES

First of all, with reference to the entirety of the figures, a general description of the invention is made, and then the details of the invention are described with a specific reference to the figures.

Figure 11:
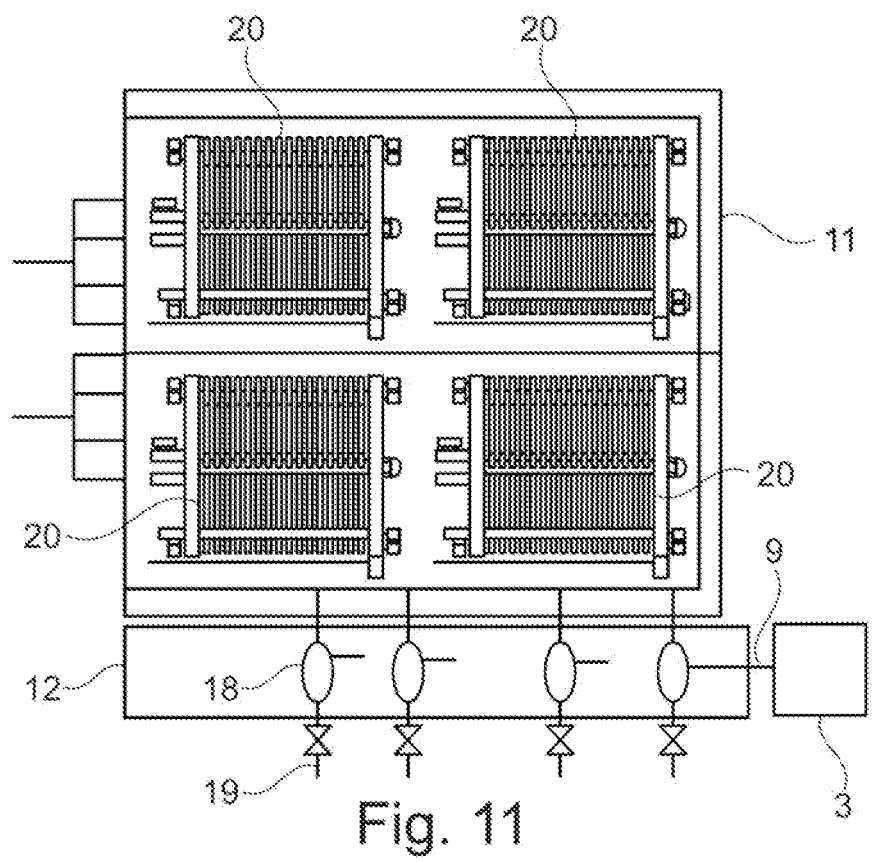
FIG. 11 shows a schematic view of an arrangement with multiple stacked plate reactors reactors according to an illustrative embodiment of the invention.

The present invention relates to an apparatus and to a method of studying chemical processes, wherein the apparatus is of modular construction and comprises a central process module having one or more oven chambers 11, 12 (see, for example, FIG. 11). At least one reactor 20 disposed in at least one oven chamber 11 of the process module is configured as a plate reactor of the filter press type, or as a stacked plate reactor. In addition, the apparatus comprises securing elements 40 for fixing of the at least one stacked plate reactor 20 in the oven chamber 11, and connecting elements for the supply conduits 30a, 30b, 30c, 30d including electrical wires, and exit conduits or outflow conduits. The apparatus of the invention is used for screening studies, for process development and/or for upscaling studies.

The screening of catalysts means that a large number of different catalysts is studied in exactly the same way in order to characterize them with regard to their performance properties. In the same way, the screening may also relate to functional elements of an apparatus in order to identify those elements here too that have the optimal performance properties. In the same way, the screening may also relate to the analysis and optimization of process parameters therein, in which case the functional elements of the apparatus are identical.

The reactor system of the invention also offers the advantage that it can be used in a modified form in a high-throughput apparatus. It is a characteristic feature of a high-throughput apparatus that it is equipped with a plurality or multitude of reaction channels.

The at least one reactor is a plate reactor of the filter press type, or a stack plate reactor 20, where the type of reactor is selected from the group of membrane plate reactor, electrochemical plate reactor in the form of a fuel cell reactor, electrochemical plate reactor in the form of an electrocatalyst, photocatalytic plate reactor, especially photocatalytic plate reactor with integrated LED source.

The individual stacked plate reactors 20, 20i, 20ii, 20iii, 20iv are formed by individual shaped building blocks 21, 22, 23, 24, which, according to the embodiment, may be arranged in different ways in a single oven chamber 11 or else in multiple oven chambers 11. This means that a stacked plate reactor 20 formed from individual shaped building blocks 21, 22, 23, 24 may have multiple identical individual reactors 30 in which the same process is being conducted. Depending, for example, on the interconnection of the individual reactors 30, either, for example, four reactions or processes are conducted in parallel or four reactions or processes in series. An individual stacked plate reactor has a multitude of individual reactors in the range from 1 to 100, preferably in the range from 2 to 48, more particularly in the range from 4 to 24. The individual stacked plate reactors 20, or the individual reactors 30 that are formed from the shaped building blocks 21, 22, 23, 24, can be arranged in a different manner within the oven chamber 11, 12 of the central process module.

The method of the invention is especially used for the study of chemical processes selected from the group of synthesis of hydrocarbons (aromatics, synthetic fuels, aliphatics), especially proceeding from carbon dioxide and water, alkenes, especially proceeding from hydrogen and carbon dioxide, alkynes, especially proceeding from hydrogen and carbon dioxide, methanol, especially proceeding from hydrogen and carbon dioxide, hydrogen, especially by electrolytic splitting of water. More particularly, the carbon dioxide used is obtained by a selective membrane separation process, for example from the fractionation of air, or by a chemical reaction. It is also possible to use combination methods in which a multitude of process steps, especially four process steps, is conducted in a single arrangement.

In a preferred embodiment, the apparatus of the invention and the method of the invention relate to the field of renewable energy and the use of renewable raw materials.

More particularly, the method of the invention relates to the synthesis of methanol and comprises one or more of the following stages:
 (a) gas fractionation methods, especially air fractionation, by means of a membrane plate reactor,
 (b) electrolytic splitting of water into hydrogen and oxygen by means of a plate reactor in the form of an electrocatalyst,
 (c) hydrogenation of carbon dioxide by means of an electrochemical membrane plate reactor,
 (d) methods of gas removal of a methanol-containing gas mixture by means of a membrane plate reactor.

A further aspect of the invention also arises from the use of the apparatus of the invention for performance of a development method. The development method is a multi-stage method comprising a series of different process stages; for example (1) to (6) process stages. One aspect of the apparatus of the invention and of the method of the invention in this context is also that the at least one stacked plate reactor 20 is configurable and enables the simulation of different screening stages or entire procedures.

In the performance of the method, the best parameter space in each case is then determined for one or more process stages. This is effected in that the stacked plate reactor 20 is used in a configuration of the oven chamber 11 in which a different process parameter is tested in each individual reactor 30 of the stacked plate reactor 20. For example, the process parameter is firstly the selection of the best-performing separation membrane for the separation of carbon dioxide from the air. One advantage is the individual configurability of the plates. It is advantageous that the different process stages in a screening configuration are studied by means of one and the same apparatus.

In a preferred embodiment, the method of the invention is used to study chemical processes in order to examine membranes; in particular, components from the group of multifunctional plates are used in the performance of the method, where the multifunctional plates are membranes having catalytic activity, especially membranes having catalytically active components, catalytically coated membranes, components manufactured by microscale engineering, components produced by means of 3D printing, elements for flow distribution with microchannels.

In one configuration for process optimization, the overall process or at least multiple coherent component stages of the process are examined in a coherent operation in terms of time. Multiple process stages are combined to form an integral process sequence. What is advantageous in the integral process regime is that the procedure is studied under real conditions in real time. It is possible here to achieve particularly exact data since the analytical devices with which the individual process stage products are characterized are used in a very narrow time window for the studies.

This results in very high accuracy in relation to the analytical data that are determined by means of the analytical instruments.

In a further mode of operation, the scaling characteristics can be studied in an enlargement of the process scale (configuration with upscaling). This is achieved in that, for example, an identical process stage is conducted under identical test conditions in multiple reactor plates of a stacked plate reactor.

A further aspect of the invention also relates to a computer program on a data carrier for control of the apparatus of the invention and performance of the method of the invention. The computer program enables the user to conduct the method of the invention in an at least partly automated manner or else in a fully automated procedure.

Figure 1:
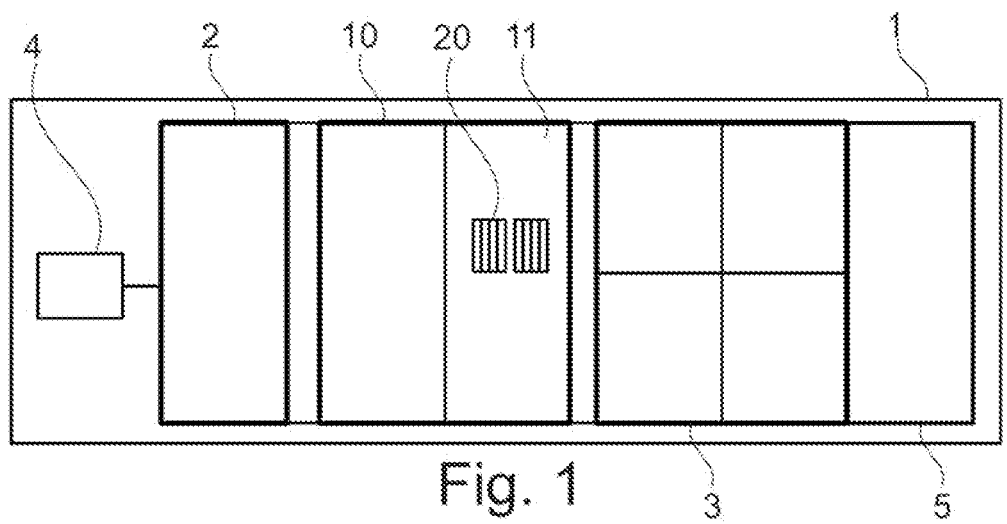
FIG. 1 shows an apparatus with a stacked plate reactor disposed therein according to an illustrative embodiment of the invention.

FIG. 1 shows an apparatus 1 with a stacked plate reactor 20 disposed therein according to an illustrative embodiment of the invention. FIG. 1 shows the schematic representation of the apparatus 1 for studying chemical processes, which is of modular construction and has a central process module with a supply module 2, an analysis module 3, a control device 4 and a control cabinet 5. Also provided is an oven 10 with an oven chamber 11. Two separate stacked plate reactors 20 are disposed in the oven chamber 11 of the process module in the embodiment shown in FIG. 1.

Figure 2:
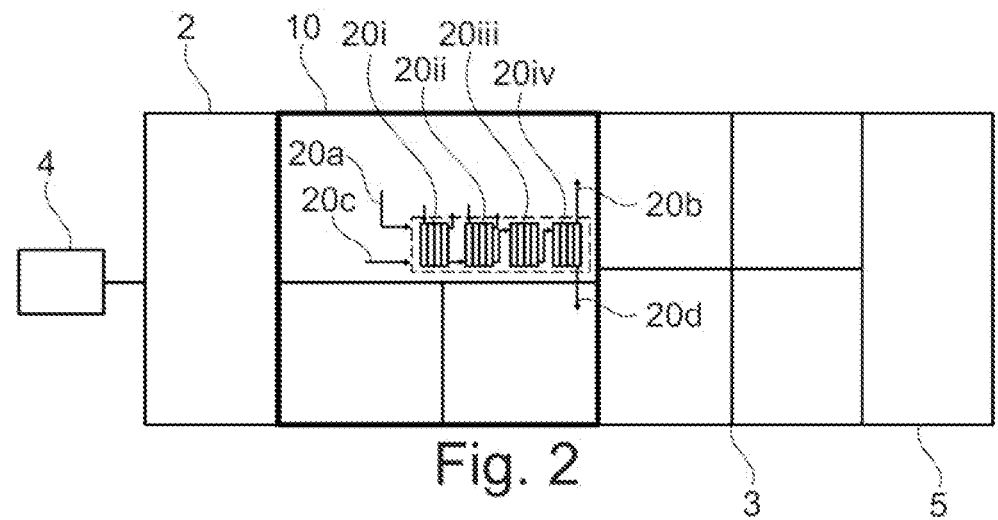
FIG. 2 shows an apparatus with a stacked plate reactor with a multitude of individual reactors disposed therein according to an illustrative embodiment of the invention.

FIG. 2 shows a further embodiment of the apparatus with a stacked plate reactor arrangement 20 disposed therein. The apparatus 1 here too has a supply module 2, an analysis module 3, a control device 4 and a control cabinet 5. In the apparatus of FIG. 2, four different stacked plate reactors 20*i*, 20*ii*, 20*iii*, 20*iv* are arranged in a series linkage in an oven chamber of an oven 10. Each individual stacked plate reactor 20*i*, 20*ii*, 20*iii*, 20*iv* comprises four reactor plates. The stacked plate reactor 20 in FIG. 2 has a primary-side inlet 20*a*, a secondary-side inlet 20*b*, a primary-side outlet 20*c* and a secondary-side outlet 20*d* of the stacked plate reactor.

It is also possible to provide a multitude of stacked plate reactors 20 that are fixed in the oven chamber 11 with securing elements. Possible positioning of the stacked plate reactors 20 in different planes along the vertical axis in one or more oven chambers 11, 12, in a sequence along a horizontal axis of one or more oven chambers 11, 12 or a stack along the vertical axis in one or more oven chambers, is possible. Some of the stacked plate reactors may be arranged along the horizontal axis in one or more oven chambers 11, 12. The stacked plate reactors 20 may especially be arranged along the horizontal axis in one or more oven chambers 11, 12 to form a single module. The module contains 2 to 10 individual reactors, especially 4 individual reactors.

Each stacked plate reactor 20 may have a number of two or more individual reactors 30, especially a number of 2 to 40 individual reactors each, especially a number of 4 to 20 individual reactors 30 each. The individual reactors 30 may have a thickness within a range from 0.5 to 4 cm, especially 0.8 to 3 cm, especially 1.5 to 2.5 cm. The height and depth of the individual reactors is within a range from, for example, 10 to 40 cm, especially within a range from 15 to 35 cm, especially within a range from 20 to 30 cm. The width of the individual stacked plate reactors is within a range from 0.01 to 0.9 m, especially within a range from 0.1 to 0.7 m.

Each individual stacked plate reactor 20 may be connected to a separate temperature control device, or all may collectively be connected to a common temperature control device.

The apparatus may, as well as one or more stacked plate reactors 20, also have one or more tubular reactors 8; where stacked plate reactors 20 and the tubular reactors 8 may be provided in a series arrangement or in a parallel arrangement; in particular, the central process module of the apparatus has a capacity to accommodate either one stacked plate reactor 20 or up to 40 tubular reactors 8.

Figure 3:
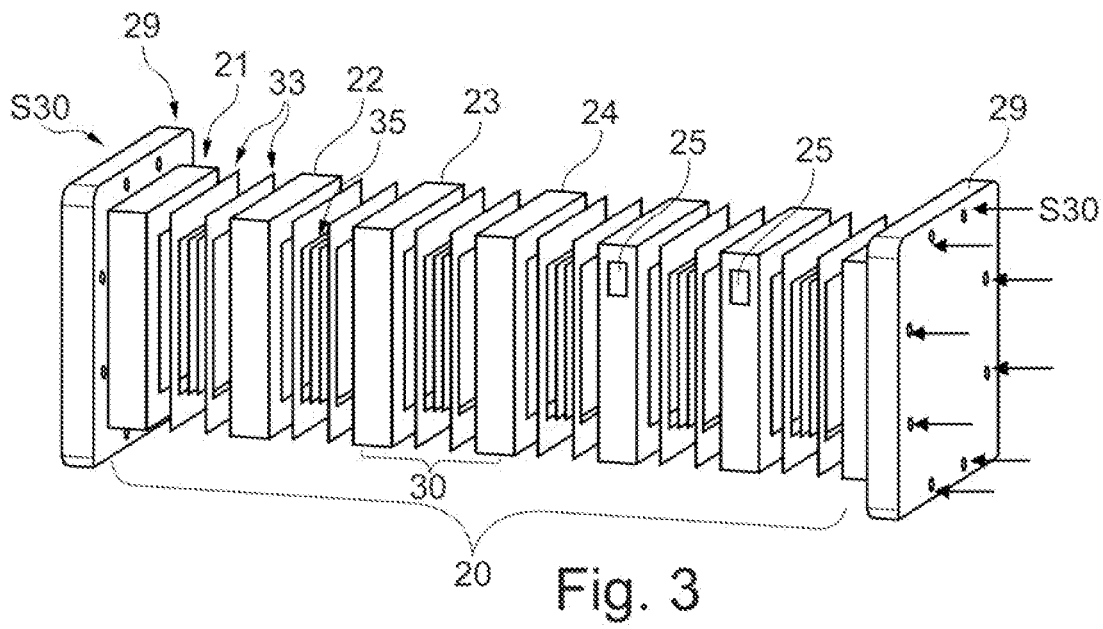
FIG. 3 shows a perspective view of a stacked plate reactor according to an illustrative embodiment of the invention.

FIG. 3 shows a perspective view of a stacked plate reactor 20. The stacked plate reactor 20 has a multitude of shaped building blocks 21, 22, 23, 24 stacked alongside one another in longitudinal direction of the stacked plate reactor. Every two adjacent shaped building blocks 21, 22; 22, 23; 23, 24 form an individual reactor 30. Specially configured end plates 29 form the terminus at either end of the stacked plate reactor 20. Between adjacent shaped building blocks 21, 22 there are reactive or nonreactive devices or elements 35 and seals 33 for sealing of the reaction spaces of the individual reactors 30. It should be noted that the seals may also be disposed directly on the plate surface and may also be fixedly bonded thereto. The reactive and nonreactive elements 35 may be of the type described above. The individual building blocks 21, 22, 23, 24 may have identifiers 25, for example in the form of a tag, a barcode or an RFID chip. This can ensure that the right shaped building block is in the right place, and can also enable automated and robot-assisted assembly. Individual components of the stacked plate reactor 20, especially the individual shaped building blocks 21, 22, 23, 24, the end plates 29, the seals 33 and the reactive or nonreactive element 35, may be pressed together in a pressing step S30.

Figure 4:
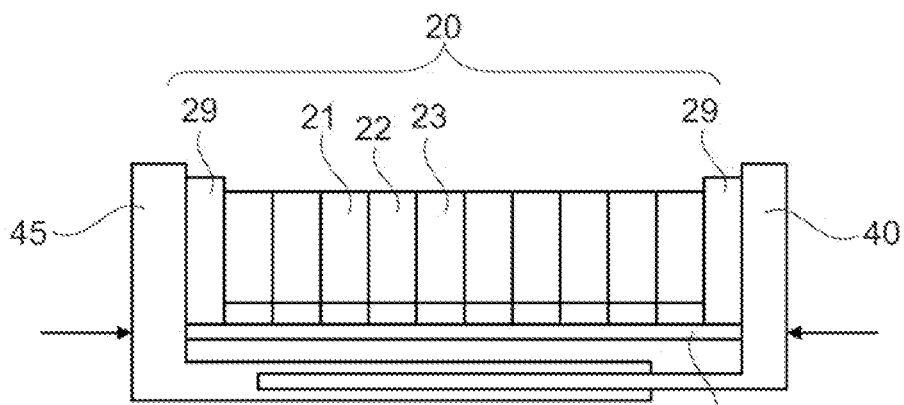
FIG. 4 shows a receiving device with a stacked plate reactor disposed therein according to an illustrative embodiment of the invention.

FIG. 4 shows a receiving device 40 with a stacked plate reactor 20 disposed therein, in which the individual shaped building blocks 21, 22, 23, 24 and the end plates 29 can be accommodated and positioned by the receiving device 40. For this purpose, a rail 41 may be provided, on which the components may be positioned by shifting. The shaped building block components 21, 22, 23, 24 and the end plate components 29 may have special receptacles that engage with the rail 41 and are also secured on the rail. A press device 45 may press the components shown in FIGS. 3 and 4 together under a defined pressure and monitor and control the contact pressure during the process. For this purpose, active control components such as hydraulic elements (not shown) or else passive compensation components may be used, these having expansion characteristics that compensate for the expansion characteristics of the stacked plate reactor even over wide temperature ranges.

Figure 5:
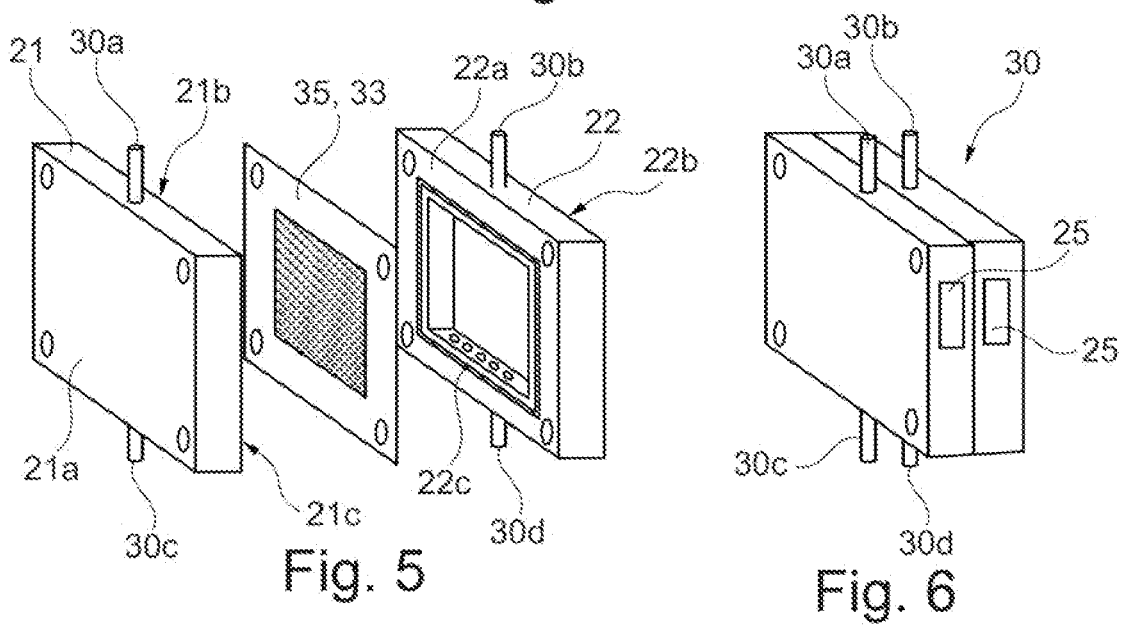
FIG. 5 shows an individual reactor in an exploded view according to an illustrative embodiment of the invention.
Figure 8:
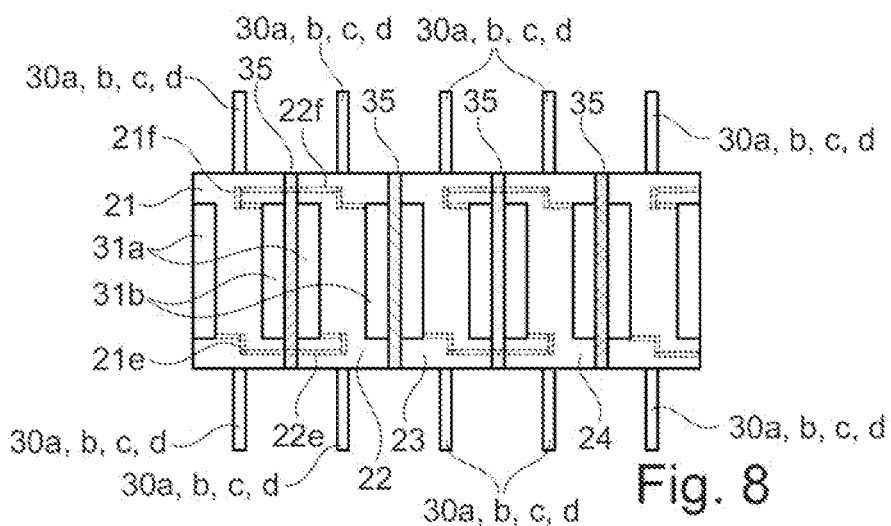
FIG. 8 shows a schematic side view of a stacked plate reactor with multiple individual reactors according to an illustrative embodiment of the invention.
Figures 9A, 9B, 9C:
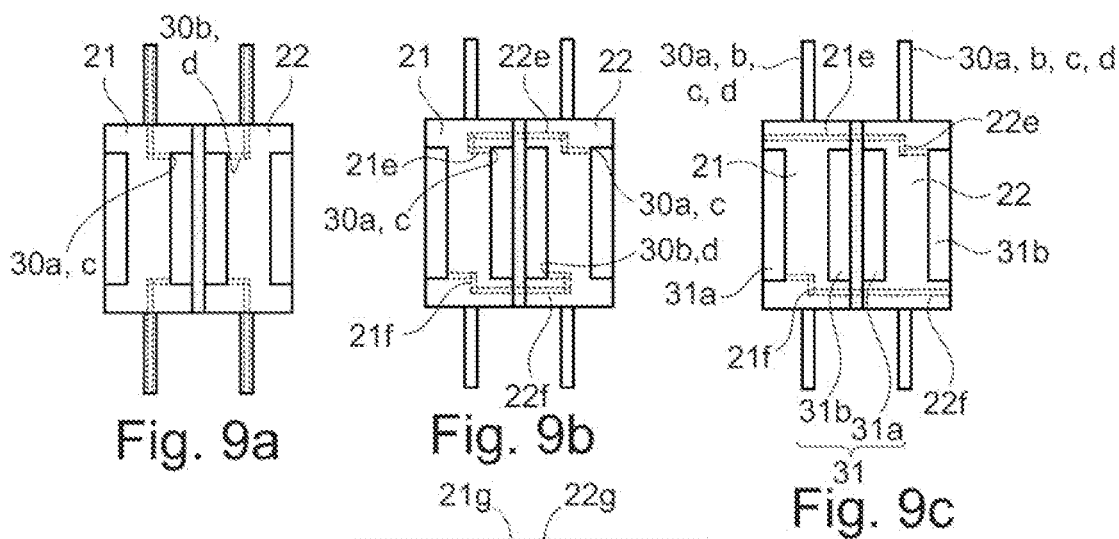
FIG. 9a shows an individual reactor composed of two shaped building blocks with an illustrative conduit flow regime according to an illustrative embodiment of the invention.
FIG. 9b shows an individual reactor composed of two shaped building blocks with a further illustrative conduit flow regime according to an illustrative embodiment of the invention.
FIG. 9c shows an individual reactor composed of two shaped building blocks with a further illustrative conduit flow regime according to an illustrative embodiment of the invention.

FIG. 5 shows an individual reactor 30 in an exploded view. The individual reactor 30, as shown in FIG. 8 and FIG. 9*c*, is formed from a reactor chamber 31 that arises from a primary-side cavity 31*a* in one of the shaped building blocks 21 and a secondary-side cavity 31*b* in an adjacent shaped building block 22. The shaped building blocks 21, 22 each have a plate surface 21*a*, 21*b*; 22*a*, 22*b*. The reactor chamber 31 is divided by the reactive or nonreactive element 35. In the embodiment shown in FIG. 5, a seal 33 also provided on the reactive or nonreactive element 35 may alternatively or additionally also be provided on the shaped building blocks 21, 22, for example on a corresponding sealing surface 21*c*, 22*c*. Inlets and outlets are provided to and from the reactor chamber, which open into the reactor chamber. In the embodiment shown in FIG. 5, the primary-side inlet 30*a* and the primary-side outlet 30*c* open into the cavity 31*a* of the first shaped component 21, while the secondary-side inlet 30*b* and the secondary-side outlet 30*d* open into the cavity 31*b* of the second shaped component 22.

Figure 6:
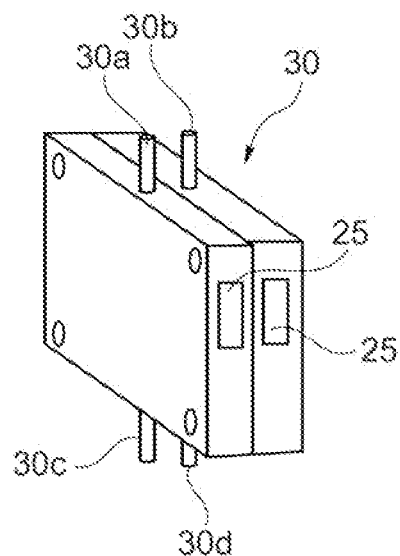
FIG. 6 shows an individual reactor in the installed state according to an illustrative embodiment of the invention.

FIG. 6 shows the individual reactor shown in FIG. 5 in the assembled state. The two shaped building blocks 21, 22 in the embodiment shown in FIG. 6 have identifiers 25, for example in the form of a barcode, QR code or RFID that identifies the shaped building block, such that this can be used to identify the properties, for instance cavity size, terminal configuration, etc.

Figures 7A, 7B, 7C:
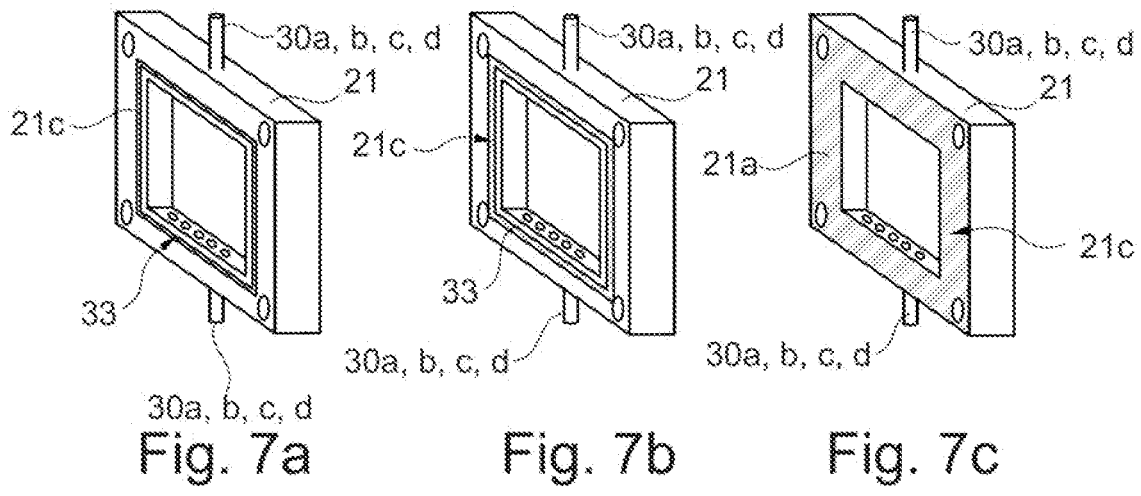
FIG. 7a shows a shaped building block with a seal arrangement according to an illustrative embodiment of the invention.
FIG. 7b shows a shaped building block with an alternative seal arrangement according to an illustrative embodiment of the invention.
FIG. 7c shows a shaped building block with an alternative seal arrangement according to an illustrative embodiment of the invention.

FIG. 7*a*, FIG. 7*b* and FIG. 7*c* show a shaped building block 21 with alternative seal arrangements. Different seals 33 or types of seal may be provided at or on the sealing surface. FIG. 7*a* illustrates a linear seal that envisages sealing via a restiform seal. FIG. 7*b* illustrates a broader seal 33, but this does not extend over bores in the face of the plate of the shaped building block. FIG. 7*c* illustrates a two-dimensional seal 33 that extends over the bores in the surface of the plate, such that any conduit connections that are established via openings in the face of the plate can likewise be sealed by the seal both on the outside and on the inside toward the cavity.

FIG. 8 shows a schematic cross section of a stacked plate reactor 20 with multiple individual reactors. Conduit arrangements 21*e*, 21*f*, 22*e*, 22*f* may be provided in the shaped building blocks 21, 22, 23, 24. These conduit arrangements may open out either in the cavities 31*a*, 31*b*, in the plate surfaces, especially at the mutually adjacent faces of the plate, or else at the outer faces, although the latter is not shown. The conduit arrangements shown in FIG. 8 permit, via opposite positioning of the openings of the pairs of conduit arrangements 21*e*, 22*e* and 21*f*, 22*f*, establishment of a conduit connection from one shaped building block in 21 to an adjacent shaped building block 22. In this way, the reactor chambers can be connected in series in the embodiment shown here. Other conduit configurations enable parallel connection, for example, and others in turn, via a branch, series connection of a reactor to a pair of reactors connected in parallel. An appropriate conduit flow regime and branching within the shaped building blocks enables any interconnection of the individual reactors without having to connect the conduits to one another externally, i.e. via external conduits. The conduit arrangements may have any geometries if they are provided, for example, in a 3D printing operation of a shaped building block.

FIG. 9*a*, FIG. 9*b* and FIG. 9*c* show different geometries of the conduit flow regime in adjacent shaped building blocks. FIG. 9*a* shows an individual reactor assembled from two shaped building blocks, in which the internal conduit arrangements firstly open in a cavity and secondly are conducted out of the side of the shaped building block, for instance in order to supply a reactant or to remove a product. FIG. 9*b* shows an embodiment in which the respective primary sides of reactors are connected to one another and secondary sides to one another. FIG. 9*c* shows an embodiment in which a conduit is run past a reactor in order to reach, for example, a next-but-one reactor.

Figure 10:
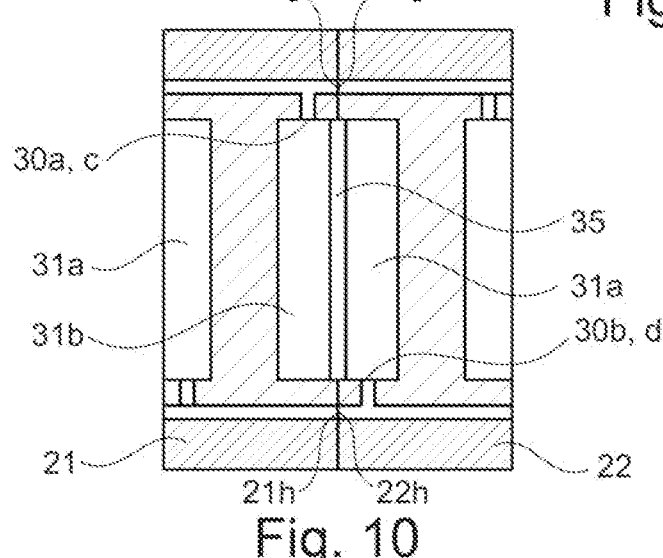
FIG. 10 shows a schematic side view of an individual reactor with a conduit flow regime according to an illustrative embodiment of the invention.

FIG. 10 shows a schematic section view of an individual reactor with a configuration of a coupling of the conduit openings 21*g*, 22*g*, 21*h*, 22*h*. There is correspondence here of the openings 21*g* and 22*g*, and of the openings 21*h* and 22*h*. In the configuration shown in FIG. 10, the conduit arrangement in the shaped building block 21, 22 is branched in each case, such that parallel connection of the adjacent reactors is enabled. In this way, the conduit arrangement can achieve parallel inlet 30*a*, 30*c* or outlets 30*b*, 30*d* into and out of the secondary-side reactor chamber 31*b* or primary-side reactor chamber 31*a*.

FIG. 11 shows a schematic view of an arrangement with multiple stacked plate reactors according to an illustrative embodiment of the invention. This shows a schematic diagram of a section from the apparatus in which four stacked plate reactors 20 are disposed in a first oven chamber 11. In a second oven chamber 12 are disposed liquid separators 18 connected via the functional connection conduits to the stacked plate reactors 20. The separators may be isolated by valves from a further outlet. For analysis of the separation products, the separators 18 may be connected via a gas conduit 9 to the analysis device 3.

Figure 12:
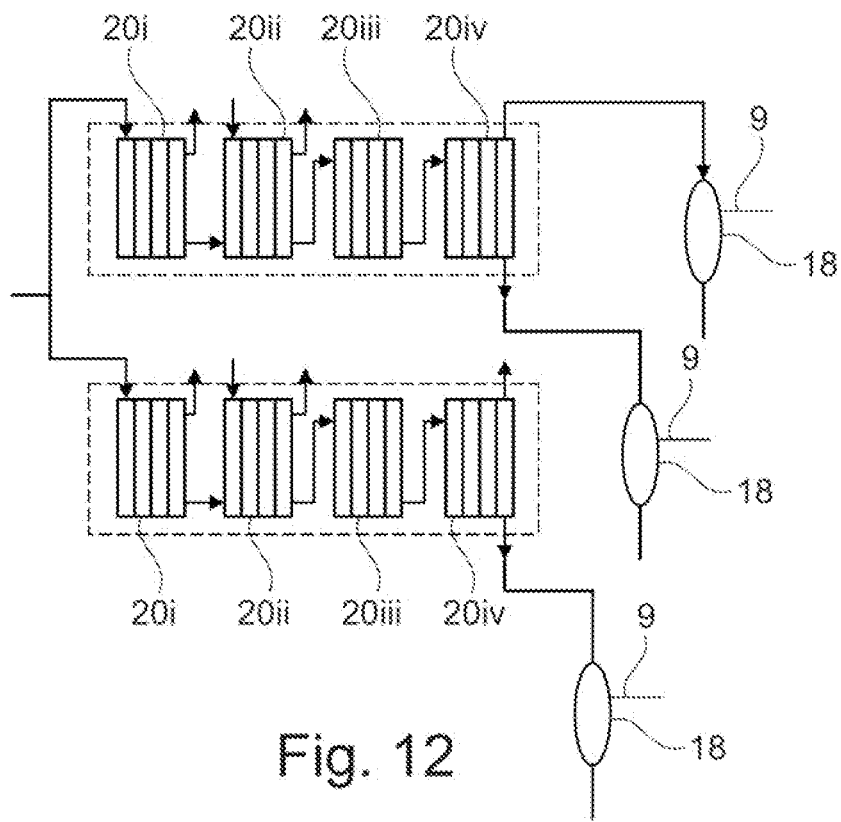
FIG. 12 shows a schematic stacked plate reactor arrangement according to an illustrative embodiment of the invention.

FIG. 12 shows a schematic diagram of a stacked plate reactor arrangement in which stacked plate reactors 20 are each connected in turn to four series-connected stacked plate reactors 20*i*, 20*ii*, 20*iii*, 20*iv*. The stacked plate reactors 20*i*, 20*ii*, 20*iii*, 20*iv* with the respective four series-connected stacked plate reactors have a common reactant fluid feed that leads in each case to the first reactor plate of the respective stacked plate reactor 20*i*. The last plate in each case of the respective stacked plate reactors 20*iv* is functionally connected to liquid separators 18, and these are connected in turn via the conduits 9 to analyzers 3 (not shown here).

Figure 13:
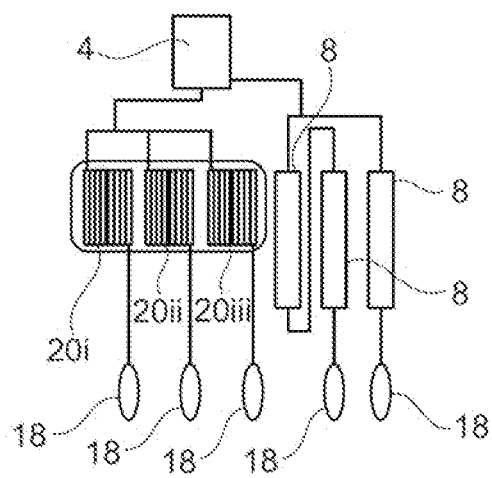
FIG. 13 shows a further schematic stacked plate reactor arrangement according to an illustrative embodiment of the invention.

FIG. 13 shows a further schematic stacked plate reactor arrangement for studying chemical processes, having three stacked plate reactors 20*i*, 20*ii*, 20*iii* and three tubular reactors 8, wherein the tubular reactors 8 have a series arrangement. The reactors 8, 20*i*, 20*ii*, 20*iii* are controlled by a control device 4. Separators 18 may in turn be provided on the reactors, and these may be connected via conduits to corresponding analyzers.

Figure 14:
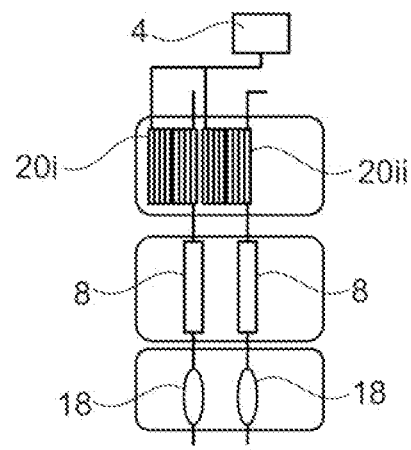
FIG. 14 shows a further schematic stacked plate reactor arrangement according to an illustrative embodiment of the invention.

FIG. 14 shows a further schematic stacked plate reactor arrangement for studying chemical processes, having a series connection of reactors in which each stacked plate reactor 20*i*, 20*ii* is connected upstream of a tubular reactor 8. Connected downstream of the tubular reactor 8 are liquid separators 18, such that there are two parallel arrangements each having a stacked plate reactor 20*i*, 20*ii*, a tubular reactor 8 and a separator 18.

Figure 15A:
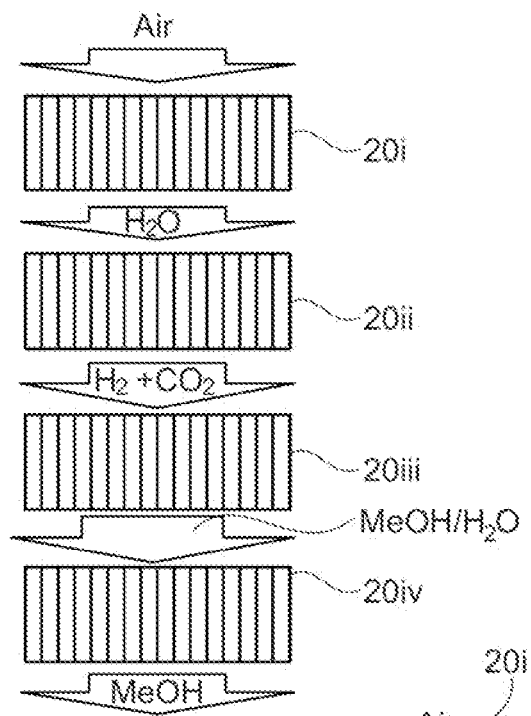
FIG. 15a shows a schematic process sequence with one stacked reactor per process step according to an illustrative embodiment of the invention.
Figure 15B:
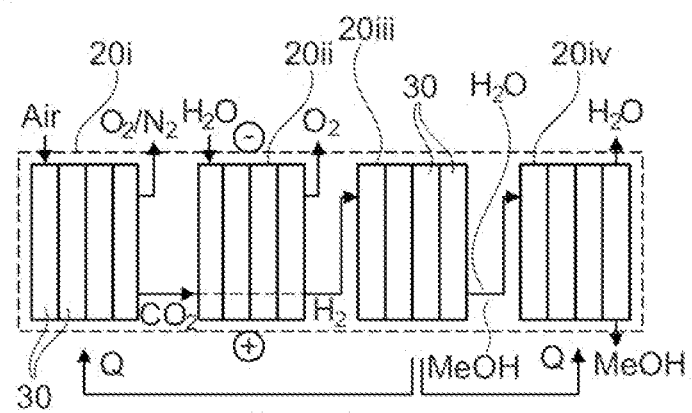
FIG. 15b shows a schematic process sequence with a combined stacked reactor for all process steps analogously to FIG. 15a according to an illustrative embodiment of the invention.

FIG. 15*a* and FIG. 15*b* show how it is possible to run a process sequence which, according to FIG. 15*a*, requires one stacked reactor for each process step, or according to FIG. 15*b* by a single stacked reactor with individual sections having different functions.

Figure 16:
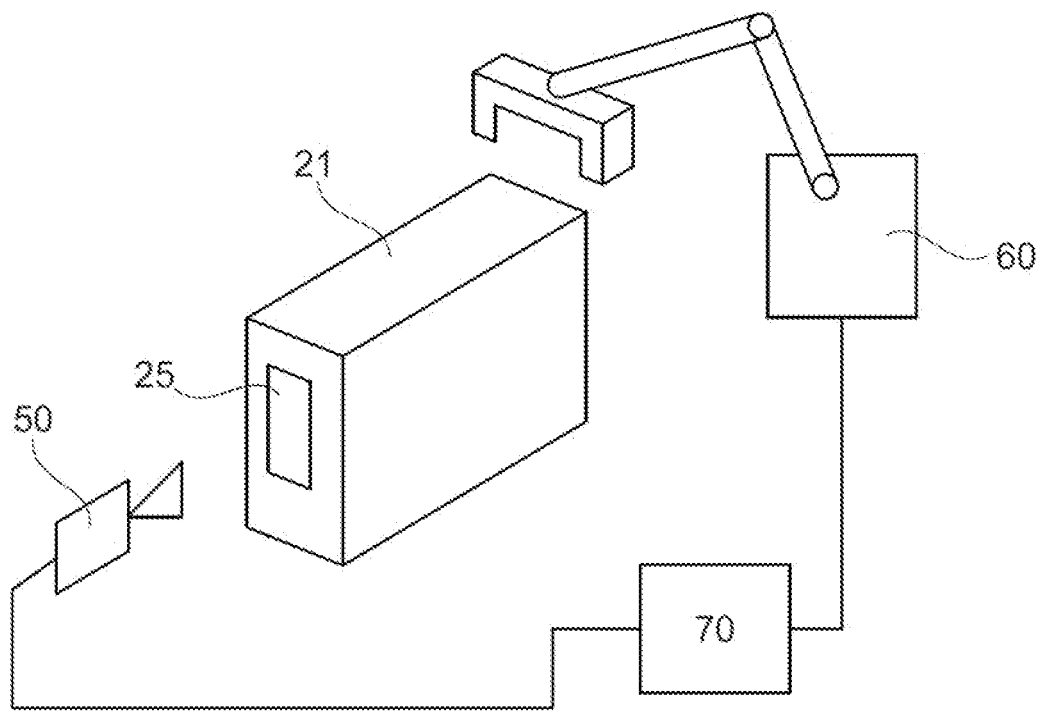
FIG. 16 shows a robot arrangement for automated assembly of a stacked plate reactor according to an illustrative embodiment of the invention.

FIG. 16 shows a robot arrangement for automated assembly of a stacked plate reactor. Individual shaped building blocks 21 are provided here with an identifier 25, which enables machine-readable identification thereof. A reading device 50 can read and recognize the identifier. The result can be passed on to a database with a build plan, which serves as basis to a robot 60 for a composition process, in which the robot is able to assemble a stacked plate reactor from individual shaped building blocks 21 according to the desired function.

Figure 17:
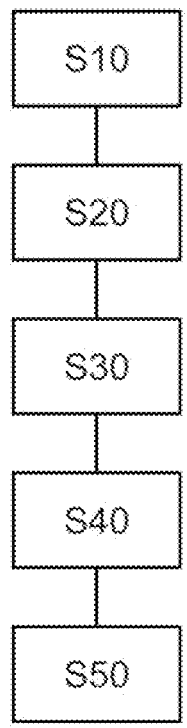
FIG. 17 shows a schematic sequence of the method of studying chemical processes according to an illustrative embodiment of the invention.

FIG. 17 shows a schematic sequence of the method of studying chemical processes according to an illustrative embodiment of the invention. The steps undertaken here are for selection S10 of a mode of operation of the stacked plate reactor, the appropriate configuring S20 of the stacked plate reactor, and the pressing S30 of the shaped building blocks one on top of another. Subsequently, introduction S40 of at least one reactant into the stacked plate reactor and control S50 of the process parameters of the individual reactors are undertaken in order to control the process.

The method may have at least one method stage selected from the group of gas fractionation methods, electrolytic splitting, hydrogenation, gas removal methods. If just one method stage is present, this method stage may be conducted in a parallel arrangement; in particular, the number of methods conducted in parallel is in the range from 2 to 48, especially from 4 to 24, especially from 8 to 20. If the method stages are conducted in a series arrangement, it is possible that the number of method stages coupled in series is in the range from 2 to 10, especially in the range from 3 to 6.

The method may especially be used to study chemical processes in order to examine membranes. More particularly, components from the group of multifunctional plates are used in the performance of the method, where the multifunctional plates are membranes having catalytic activity, especially membranes having catalytically active components, catalytically coated membranes, components manufactured by microscale engineering, components produced by means of 3D printing, and elements for flow distribution with microchannels.

It is likewise possible to provide a computer program on a data carrier for control of the apparatus of the invention and for performance of the method of the invention.

A method of performing a laboratory process with the aid of an apparatus of the invention may have the following steps: receiving, by means of a central control unit, an instruction to conduct a laboratory process; planning, by the central control unit, the laboratory process; selecting the laboratory devices required for the purpose; arranging the laboratory devices required according to the laboratory process; performing the laboratory process with the aid of a handling system; recording and storing the data generated in the performance of laboratory process in a database in the central control unit.

Figure 18:
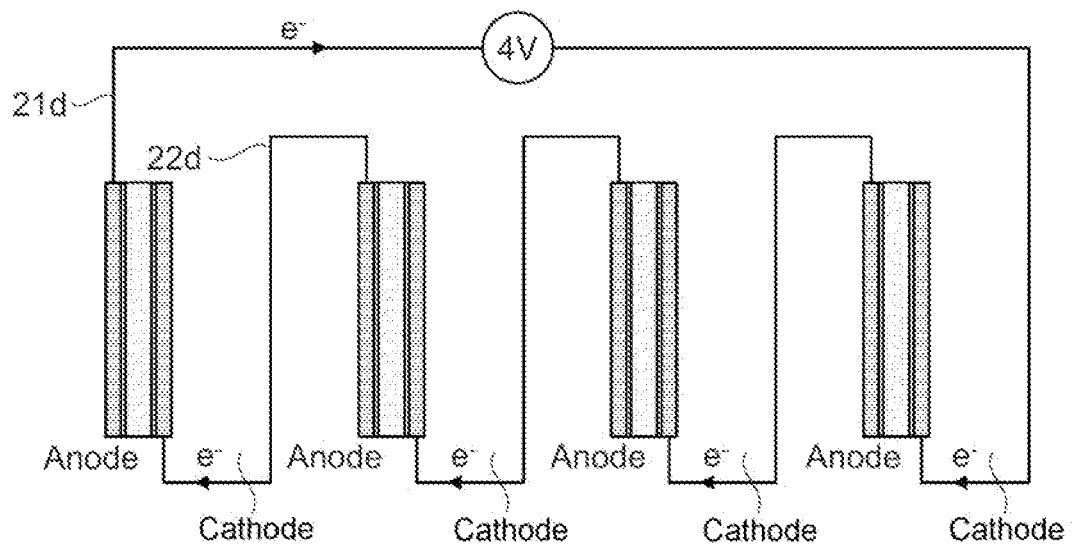
FIG. 18 shows an interconnection of multiple individual reactors in an electrical process according to an illustrative embodiment of the invention.

FIG. 18 shows an interconnection of multiple individual reactors in an electrical process according to an illustrative embodiment of the invention, in which multiple individual reactors with connecting conduits 22d are connected in series in order to test fuel cells at elevated output voltage. FIG. 18 is a schematic diagram, where the individual reactors can in turn be implemented from individual shaped building blocks alongside one another.

Figure 19A:
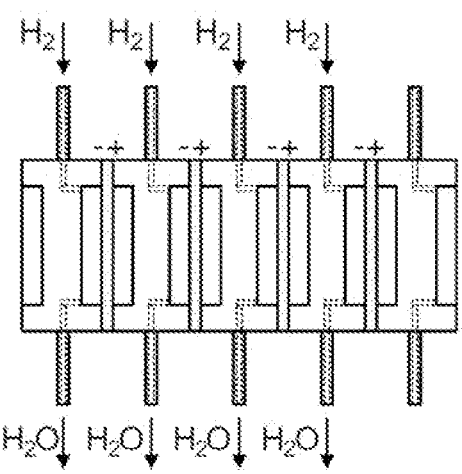
FIG. 19a shows a process sequence for a first (left-hand) side of the individual reactors according to an illustrative embodiment of the invention.
Figure 19B:
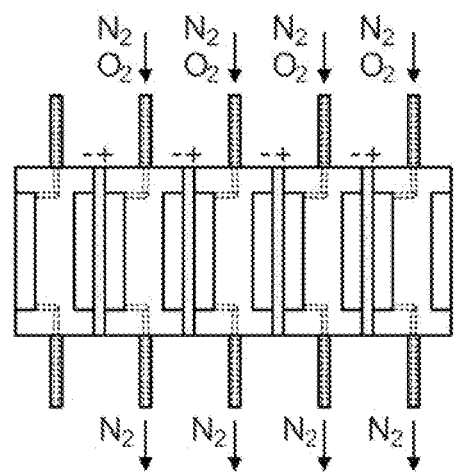
FIG. 19b shows a process sequence for a second (right-hand) side of the individual reactors from FIG. 19a according to an illustrative embodiment of the invention.

FIG. 19a and FIG. 19b show one and the same stacked plate reactor, but in section views of various planes. FIG. 19a shows a process sequence for a first (left-hand) side of the individual reactors, in which H2 is supplied to the primary side. As can be inferred from FIG. 19b, N2 and O2 are supplied to the secondary side (different section plane of the feed conduit). A reaction takes place in the reactor, in which H2O is obtained on the primary side, and pure N2, for example, is separated out at full conversion on the secondary side. The primary-side inlets and outlets are in a section plane, whereas the secondary-side inlets and outlets are in a different section plane.

Figure 20:
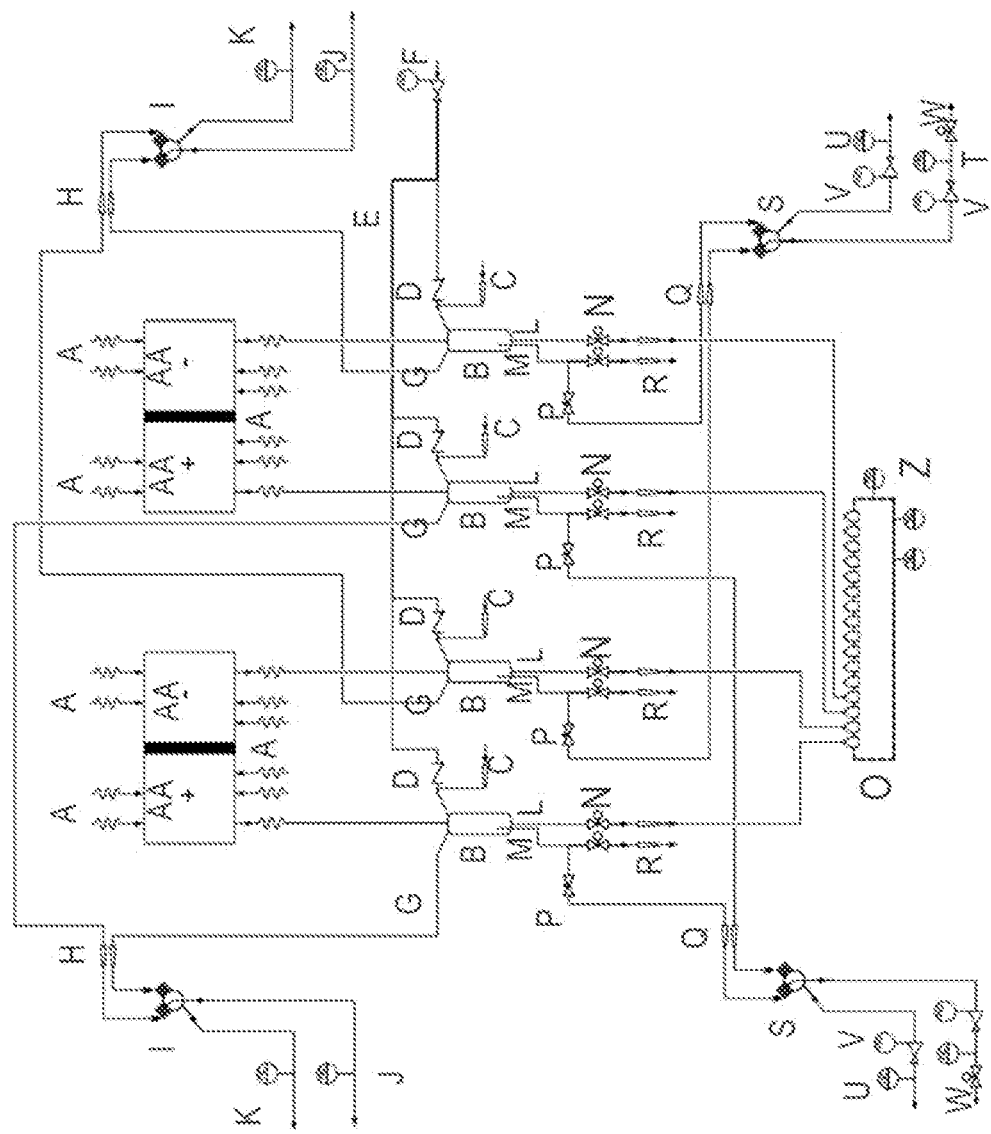
FIG. 20 shows a process flow diagram for performance of electrochemical parallel operation of reactors suitable for the screening of catalysts according to an illustrative embodiment of the invention.

FIG. 20 shows a process flow diagram for performance of electrochemical parallel operation of reactors that are suitable for the screening of catalysts according to a working example of the invention. Each individual cassette (AA) (half-cell, cathode, anode) of the EPR is connected (A) to an electrically nonconductive pipeline system for the reactants and products. The pipeline system has particular dimensions, internal diameter (<¼") and length, that distinctly increase electrical resistance (>$10^3 \Omega$, electrical conductivity via ion conduction via the electrolyte, and lower the short-circuit current to a value which is negligible for the purposes of the experiment (>$10^{-4}$ A). Materials for the pipeline system may include Teflon, PEEK, PPS or other materials having the required properties (electrically insulating, thermal stability <200° C., pressure stability <100 barg, chemical stability). The product stream from each individual cassette is guided through an immersed tube in an individual gas/liquid separator (B). In addition, a diluent gas can be introduced in each gas/liquid separator (C). The diluent gas may be used to build up the reaction pressure in the reactor system or to change the composition of the gas phase, for example to lower the partial pressures, to avoid condensation or to optimize the gas matrix for the downstream analysis. In addition, a pressure-maintaining gas is introduced in each gas/liquid separator (D). The individual pressure-maintaining gases in the gas/liquid separator are connected to one another by a connecting conduit via non-return flaps and can communicate with one another (E). In the connecting conduit, there is a pressure regulator that controls the pressure in the collecting conduit and hence also the pressure in the individual gas/liquid separators (F). Cross-contamination is avoided by the use of the non-return flaps.

In the gas/liquid separator, the liquid phase (product+electrolyte+reactant) is separated from the gas phase (product+reactant+diluent gas+pressure-maintaining gas) (B). The gas phase escapes continuously at the top of the gas/liquid separator (G). Here, there is a capillary (restriction capillary) (H) that generates a backpressure in each conduit. With the aid of the variable components of the gas phase (diluent gas+pressure-maintaining gas) and the design of the restriction capillaries, it is possible to adjust the reactor pressure within a particular parameter field. All individual cassettes may be fed by at least one diluent gas supply. The volume flow rate of diluent gas may be distributed homogeneously between the individual cassettes with the aid of capillary technology. Multiple diluent gas supplies increase the flexibility of the system. All individual cassettes are provided with at least one pressure-retaining gas, in combination with reactor pressure regulation. Multiple pressure-retaining gas and reactor pressure controllers increase the flexibility of the system. The product stream (gas phase) from the individual gas/liquid separator is expanded to a lower pressure via the restriction capillaries (H) and selected for a downstream analysis with the aid of a selection valve (I). The volume flow rate or mass flow rate of the product stream selected is measured continuously (J).

The collected product stream (gas phase), i.e. all product streams apart from the selected product stream, is guided into the offgas, an offgas aftertreatment or another processing operation. The volume flow rate or mass flow rate of the collected product stream is measured continuously (K).

The liquid phase can escape via two outlets at the base (L) and close to the base (M) of the gas/liquid separator. In both conduits there are automatic shutoff valves (N). Via the withdrawal point at the base (L), it is automatically possible to remove liquid samples from the gas/liquid separator. By virtue of the height of the withdrawal point (immersed pipe) close to the base (M) in the gas/liquid separator, it is possible to adjust the sampling volume for the automatic liquid sampling. The liquid sampling is effected into sample tubes, or in one embodiment into an automatically controlled and heated (Z) sampling system (autosampler) (O). In the sampling, the liquid sample is expanded via a capillary (R) to a lower pressure. The sampling point close to the base (M) is equipped with an automatic shutoff valve (N) and a manual shutoff valve (P). With the aid of the manual shutoff valves (P), it is possible to decouple the continuous sampling from the system. In the case of continuous sampling from the gas/liquid separator, the liquid phase from the withdrawal point close to the base is expanded via capillaries (Q) to a lower pressure. The capillaries (Q) can be heated by additional heaters. By variation of the heater temperature, it is possible to adjust the continuous volume flow rate of liquid phase from the gas/liquid separator. By means of the automatic shutoff valve (N), it is possible to empty the gas/liquid separator via a capillary (R) up to the level of the immersed tube. This is a discontinuous mode of sampling.

The continuous product stream (liquid phase) from the individual gas/liquid separator is expanded to a lower pressure via the restriction capillaries (Q) and selected for a downstream analysis with the aid of a selection valve (S). The volume flow rate or mass flow rate of the product stream selected (liquid phase) is measured continuously (T). The continuous collected product stream (liquid phase), i.e. all product streams apart from the selected product stream, is guided into a collecting vessel or another processing operation. The volume flow rate or mass flow rate of the collected product stream is measured continuously (U). Both product streams (liquid phase), i.e. the one selected and the overall stream, are each equipped with a pressure controller (V) that keeps the hold pressure constant. This prevents pressure surges when the separation valve is moved. With the aid of the separation valve (S), it is possible to check the volume or mass flow rate of the individual cassettes at defined time intervals. This mechanism, including the option of emptying the gas/liquid separator discontinuously, is intended to prevent overflow of the gas/liquid separator and assure robust operation. For discontinuous sampling via the automatic shutoff valve (N), the continuous sampling for this gas/liquid separator is stopped beforehand by selecting this gas/liquid separator with the selection valve (S) and closing the automatic valve (W). This is intended to prevent unwanted gas breakthrough.

The discontinuous sampling, and the sampling into the sampling system (O), is stopped when the liquid column has been displaced from the gas/liquid separator and the gas column breaks through. The breakthrough of gas is detected via the pressure-retaining system (pressure-maintaining gas). In this embodiment, it is possible to empty the two gas/liquid separators (e.g. anode and cathode) in parallel, since there are two pressure-retaining systems.

LIST OF REFERENCE NUMERALS 1 apparatus for studying chemical processes
2 supply module
3 analysis module
4 control device
5 control cabinet
8 tubular reactor
9 gas conduit to analysis module
10 oven
11 oven chamber
12 oven chamber
18 separator
19 valve
20 stacked plate reactor
20i stacked plate reactor
20ii stacked plate reactor
20iii stacked plate reactor
20iv stacked plate reactor
20a primary-side inlet of the stacked plate reactor
20b secondary-side inlet of the stacked plate reactor
20c primary-side outlet of the stacked plate reactor
20d secondary-side outlet of the stacked plate reactor
21 shaped building block of a stacked plate reactor
21a plate surface of the shaped building block
21b plate surface of the shaped building block
21c seal surface of the shaped building block
21d electrical supply
21e first conduit arrangement
21f second conduit arrangement
21g opening of the conduit arrangement at the plate surface
21h opening of the conduit arrangement at the plate surface
22 shaped building block of a stacked plate reactor
22a plate surface of the shaped building block
22b plate surface of the shaped building block
22c seal surface of the shaped building block
22d electrical supply
22e first conduit arrangement
22f second conduit arrangement
22g opening of the conduit arrangement at the plate surface
22h opening of the conduit arrangement at the plate surface
23 shaped building block of a stacked plate reactor
24 shaped building block of a stacked plate reactor
25 identifier of a shaped building block, barcode
29 end plates of the stacked plate reactor
30 individual reactor
30a primary-side inlet of an individual reactor
30b secondary-side inlet of an individual reactor
30c primary-side outlet of an individual reactor
30d secondary-side outlet of an individual reactor
31 reactor chamber of an individual reactor
31a cavity, primary-side cavity
31b cavity, secondary-side cavity
33 seal
35 reactive element, reactive device
40 receiving device
41 rail
45 press device
50 reading device
60 robot
70 data basis, build plan
S10 selecting a mode of operation of the stacked plate reactor
S20 configuring the stacked plate reactor
S30 pressing the shaped building blocks stacked one on top of another
S40 introducing at least one reactant into the stacked plate reactor
S50 controlling the process parameters of the individual reactors

What is claimed is:

1. An apparatus for studying chemical processes, having:
an oven having at least one oven chamber,
a stacked plate reactor having a multitude of mutually adjacent plate-shaped building blocks and at least one feed for a reactant and at least one drain for a product, and
a connection device for connection of the stacked plate reactor to at least one oven-side feed for a reactant and at least one oven-side drain for a product,
wherein the oven chamber has a receiving device configured such that it can accommodate the multitude of mutually adjacent shaped building blocks of the stacked plate reactor,
wherein the multitude of shaped building blocks of the stacked plate reactor in the receiving device are stacked one on top of another in such a way that they form a multitude of reactor chambers each with a feed for a reactant and at least one drain for a product, and one of a reactive device and a nonreactive device that each form an individual reactor, wherein the receiving device has a press device configured such that it can compress the multitude of stacked mutually adjacent shaped building blocks of the stacked plate reactor in stacking direction, wherein the multitude of reactor chambers may electively be connected in parallel and/or in series.

2. The apparatus for studying chemical processes according to claim 1, wherein the apparatus comprises a supply module for providing resources for the adjustment of process parameters, an analysis module for analysis of at least one product, and a control device for control of the process parameters.

3. The apparatus for studying chemical processes according to claim 2, wherein the control device is configured such that it can separately control at least one of the process parameters for at least one of the individual reactors.

4. The apparatus for studying chemical processes according to claim 1, wherein the receiving device has a rail configured such that it can accommodate the shaped building blocks in a predetermined alignment and position.

5. The apparatus for studying chemical processes according to claim 4, wherein the rail of the receiving device constitutes a positioning aid for the press device.

6. The apparatus for studying chemical processes according to claim 1, wherein the receiving device is designed to compensate for thermal expansion of the stacked plate reactor.

7. The apparatus for studying chemical processes according to claim 1, wherein the stacked plate reactor has a heating device, wherein the heating device is designed such that it can heat the stacked plate reactor and hence causes thermal expansion of the stacked plate reactor that compresses the stacked plate reactor into the receiving device in such a way that a sealing geometry seals the respective shaped building blocks with respect to one another.

8. The apparatus for studying chemical processes according to claim 1, wherein the apparatus has at least one separator functionally connected to at least one of the individual reactors and/or reactive elements of an individual reactor, wherein the at least one separator is especially disposed in an oven chamber isolated from the oven chamber in which the stacked plate reactor is disposed.

9. The apparatus for studying chemical processes according to claim 1, wherein the apparatus has a reader unit for reading identifiers provided on the shaped building blocks and a robot, wherein the reader unit is designed such that it can read identifiers provided on the shaped building blocks, wherein the robot is designed such that it assembles the shaped building blocks identified by the reader unit on the basis of a definable structural build plan or functional build plan for an intended functionality of the stacked plate reactor.

10. A stacked plate reactor for use in an apparatus according to claim 1, wherein the stacked plate reactor has a multitude of mutually adjacent plate-shaped building blocks;

at least one feed for a reactant, at least one drain for a product, and wherein the multitude of shaped building blocks of the stacked plate reactor are stacked one on top of another, wherein the multitude of shaped building blocks stacked one on top of another are compressible in stacking direction.

11. The stacked plate reactor according to claim 10, wherein each of the shaped building blocks has a cavity on a plate surface of the shaped block with a circumferential sealing surface around the cavity and at least one of a feed for a reactant and a drain for a product that opens into a cavity in such a way that the cavities of two adjacent shaped blocks in the mutually facing and assembled state form a reactor chamber, wherein a reactive device is disposed between two adjacent shaped blocks.

12. The stacked plate reactor according to claim 11, wherein the reactive device of at least one pair of shaped blocks is a catalyst and at least one of the two shaped blocks of the pair of shaped blocks has an electrical feed to the catalyst in order to electrically actuate the catalyst.

13. The stacked plate reactor according to claim 10, wherein each of the shaped building blocks has at least one conduit arrangement having at least one opening that opens on the plate surface with the cavity, such that conduit arrangements of two shaped blocks alongside one another on the cavity side are connected to one another via respective openings, and at least one of an opening that opens on the opposite plate surface from the plate surface with the cavity, and an opening that opens into the cavity.

14. The stacked plate reactor according to claim 10, wherein at least some of the shaped building blocks have an identifier, especially one that is machine-readable, which identifies the shaped building block with regard to a geometry of its conduit arrangement.

15. The stacked plate reactor according to claim 10, wherein at least some of the shaped building blocks have a first conduit arrangement that serves for parallel connection of mutually adjacent reactor chambers, and a second conduit arrangement that serves for series connection of mutually adjacent reactor chambers, wherein the first and second conduit arrangements are arranged in the respective shaped building block in such a way that, in a first orientation of the shaped building block, the first conduit arrangement is connected to a corresponding conduit arrangement of an adjacent shaped building block and is active and, in a second orientation of the shaped building block, the second conduit arrangement is connected to a corresponding conduit arrangement of an adjacent shaped building block and is active.

16. A method of studying chemical processes using an apparatus according to claim 1, wherein the method comprises:

choosing a mode of operation of the stacked plate reactor from parallel operation, series operation or mixed parallel and series operation of the individual reactors of the stacked plate reactor, configuring the stacked plate reactor by stacking the shaped building blocks according to the chosen mode of operation, pressing the stacked adjacent shaped building blocks of the stacked plate reactor in stacking direction, introducing at least one reactant into the stacked plate reactor, controlling the process parameters of the individual reactors according to the chosen mode of operation, wherein the method conducted by the at least one individual reactor is selected from the group consisting of a gas fractionation method, an electrolytic splitting, a hydrogenation, a gas removal method, a conversion of electrical energy to chemical products of value, especially power-to-gas or power-to-liquid, a conversion of chemical binding energy to electrically usable energy, an assistance of catalytic processes by application of an electrical field for reduction of the activation energy, a heterogeneous catalysis and a heterogeneous gas phase catalysis.

17. The method of studying chemical processes according to claim 16, wherein, for the individual process stages, the process parameter of temperature is chosen within the range from 273.15 K to 1273.15 K, especially within the range from 298.15 to 1073.15 K, more especially at a temperature in the range of 373.15-873.15 K.

18. The method of studying chemical processes according to claim 16, wherein, for the individual process stages, the process parameter of pressure is chosen within the range from 0.05 to 500 bara, especially within the range from 0.1 to 300 bara, more especially in the range of 1 to 250 bara.

19. The method of studying chemical processes according to claim 16, wherein the method can be conducted in different configurations, wherein the configuration is selected from the group consisting of screening configuration, integral process regime for implementation of subsequent processes, and configuration with upscaling of individual process steps or sequences of process steps, and product recycling to increase the product yield.

20. The method of studying chemical processes according to claim 16, wherein membranes are studied by selecting the reactive elements from the group consisting of multifunctional plates in the form of membranes that have catalytic activity, membranes having catalytically active components, and catalytically coated membranes, and also stacked membranes in which each membrane surface has a particular property.

* * * * *